United States Patent
Rijneveldshoek et al.

(10) Patent No.: US 12,408,664 B2
(45) Date of Patent: *Sep. 9, 2025

(54) PRODUCTS AND METHODS FOR MICROBE INHIBITION ON LIVE PLANTS BY CARBOXYLIC ACIDS AND THEIR SALTS

(71) Applicant: NIACET CORPORATION, Niagara Falls, NY (US)

(72) Inventors: Peter Rijneveldshoek, Oostvoorne (NL); Kelly Brannen, North Palm Beach, FL (US); Stanley Sojka, Frederick, MD (US)

(73) Assignee: NIACET CORPORATION, Niagara Falls, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/227,168

(22) Filed: Jul. 27, 2023

(65) Prior Publication Data

US 2023/0363387 A1   Nov. 16, 2023

Related U.S. Application Data

(63) Continuation of application No. 17/161,960, filed on Jan. 29, 2021, now Pat. No. 11,751,564, which is a continuation of application No. 16/575,983, filed on Sep. 19, 2019, now Pat. No. 10,939,679.

(60) Provisional application No. 62/746,197, filed on Oct. 16, 2018.

(51) Int. Cl.
*A01N 37/02* (2006.01)
*A01N 25/02* (2006.01)
*A01N 37/08* (2006.01)
*A01N 37/10* (2006.01)

(52) U.S. Cl.
CPC ............. *A01N 37/02* (2013.01); *A01N 25/02* (2013.01); *A01N 37/08* (2013.01); *A01N 37/10* (2013.01)

(58) Field of Classification Search
CPC ........ A01N 25/02; A01N 37/02; A01N 37/08; A01N 37/10
See application file for complete search history.

(56) References Cited

U.S. PATENT DOCUMENTS

| | | |
|---|---|---|
| 3,968,259 A | 7/1976 | Henry et al. |
| 4,556,505 A | 12/1985 | Fenn |
| 4,851,223 A | 7/1989 | Sampson |
| 4,859,480 A | 8/1989 | MacFarlane et al. |
| 5,599,804 A | 2/1997 | Mudge |
| 5,780,023 A | 7/1998 | McLaughlin et al. |
| 6,855,668 B2 | 2/2005 | Milus |
| 7,771,752 B2 | 8/2010 | Bartlett et al. |
| 7,955,632 B2 | 6/2011 | Paulsen et al. |
| 8,124,566 B2 | 2/2012 | Walter et al. |
| 8,877,272 B2 | 11/2014 | Portilho |
| 9,888,686 B2 | 2/2018 | Yonemura et al. |
| 2004/0167220 A1 | 8/2004 | Horst et al. |
| 2005/0048176 A1 | 3/2005 | McNeff et al. |
| 2006/0247130 A1 | 11/2006 | Van der Krieken et al. |
| 2007/0249699 A1 | 10/2007 | Coleman |
| 2009/0023667 A1 | 1/2009 | Tomura et al. |
| 2009/0120339 A1 | 5/2009 | Detweiler et al. |
| 2009/0156403 A1 | 6/2009 | Norman et al. |
| 2010/0144534 A1 | 6/2010 | Pullen |

FOREIGN PATENT DOCUMENTS

| | | |
|---|---|---|
| CN | 10587614 A | 8/2016 |
| CN | 106509364 A | 3/2017 |
| CN | 106615701 A | 5/2017 |
| JP | H0163109 A | 6/1993 |

OTHER PUBLICATIONS

Lawnaddicts, "Identifying turf disease and fungus", pp. 1-5, publ. Aug. 23, 2018 (Year: 2018).*
Landhuis, "Bananas under attack: Understanding their foes", pp. 1-4, publ. Oct. 12, 2016 (Year: 2016).*
Cornell University Coll. Agricult. & Life Sci., pp. 1-3, publ. Jan. 2018 (Year: 2018).*
UMass Extension Greenhouse Crops and Floriculture Program, "Harvesting and Handling Cut Flowers", pp. 1-7, publ. Aug. 2016 (Year: 2016).*
Jo et al., "Rapid development of fungicide resistance by sderotinia homoeocarpa on turfgrass," The American Phytopathoiogicai Soc,, vol. 98, pp. 1297-1304 (2008).
Kiecana et al., "Fungi colonizing the sowing material of turfgrasses considering susceptibility of cultivars to selected pathogens," Acta Sd. Pol., Hortorum Cultus, vol. 11 (5), pp. 153-168 (2012).
Muller, P.J., "Botrytis Cinerea, Cause of Different Diseases in Tulips," Acta Horticulturae, vol. 266, pp. 447-455 (1990).
Vincelli, P., et al., "Chemical Control of Turfgrass Diseases 2017," pp. 1-32, available at http://www2.ca.uky.edu/agcomm/pubs/ppa/ppa1/ppa1 PDF.

* cited by examiner

*Primary Examiner* — Sarah Pihonak
(74) *Attorney, Agent, or Firm* — Sughrue Mion, PLLC

(57) ABSTRACT

The present invention relates to methods for inhibiting the growth of microbes on live plants using compositions comprising a carboxylic acid of Formula (I) or salt thereof:

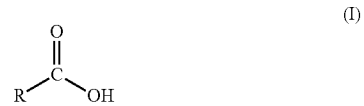

wherein R is H, Ph, Ar, or a $C_1$-$C_{60}$ alkyl. The present invention also relates to live plant products contacted with compositions comprising a carboxylic acid of Formula (I) or salt thereof.

20 Claims, 5 Drawing Sheets

Control          CaP

Control          CaP

Control          CaP

Control          CaP

Control      CaP

Control      CaP

Control      CaP

Control      CaP

PRODUCTS AND METHODS FOR MICROBE INHIBITION ON LIVE PLANTS BY CARBOXYLIC ACIDS AND THEIR SALTS

CROSS-REFERENCE TO RELATED APPLICATIONS

This application is a Rule 53(b) Continuation Application of U.S. application Ser. No. 17/161,960 filed Jan. 29, 2021, which is a Rule 53(b) Continuation of U.S. application Ser. No. 16/575,983 filed Sep. 19, 2019, now U.S. Pat. No. 10,939,679 issued Mar. 9, 2021, which claims benefit of U.S. Provisional Application No. 62/746,197 filed Oct. 16, 2018, the contents of all of which are hereby incorporated by reference in their respective entireties.

FIELD OF THE INVENTION

The present invention relates to the use of compositions comprising a carboxylic acid or salt thereof to inhibit microbial growth on live plants. The present invention also relates to live plant products contacted with compositions comprising a carboxylic acid or salt thereof.

BACKGROUND OF THE INVENTION

The control of growth of microbes and the plant diseases they cause is a great concern in a large variety of botanical and agricultural areas, such as, for instance, production and maintenance of ornamental plants, turfgrass, vegetables, grain, and fruit crops. Overcoming microbe growth and disease are important for achieving optimal plant growth, development, and production. Destruction of valuable plants by microbes is a constant threat to the food supply, while rampant population growth has put pressure on the need for increased food production to prevent starvation.

In addition, increased population growth and urbanization over the past several decades have resulted in the wide spread cultivation of turfgrass as a means to enhance the functional, recreational, and aesthetic value of urban spaces. This growth has rendered culture and maintenance of turfgrass an important horticultural industry in North America with annual expenditures reaching upwards of $45 billion dollars. Maintaining healthy turfgrass is of interest to consumers not only for private residences, but also for businesses. Perhaps the most prominent business market for turfgrass is the golf industry, where grounds keepers strive to maintain large expanses of flawless, healthy green turfgrass.

Turfgrass, in addition to numerous other live plants and crops, is susceptible to a host of common diseases such as dollar spot, brown patch, summer patch, take-all patch, and stem rust. Dollar spot is one of the more common diseases turfgrass managers face during the growing season. It is a foliar disease that impacts both warm and cool-season turfgrass around the world. All major cool-season turfgrass types can be infected by dollar spot. Some turfgrass types are more susceptible to dollar spot such as certain cultivars of creeping bentgrass or seashore *paspalum*. In addition to seashore *paspalum*, other warm-season turfgrass impacted are bermudagrass, zoysiagrass, and centipedegrass.

Depending on the turfgrass type and management segment (golf course, sports field or home lawn), dollar spot can cause varying degrees of turfgrass damage from blighted, discolored leaf blades in home lawns to severe scarring on golf course putting greens. In these situations, dollar spot can disrupt the overall aesthetics of turfgrass and have a negative impact on the playability of surfaces by causing detrimental scarring.

Dollar spot is a foliar disease causing blighting of leaf blades. Symptoms for this disease may look different depending upon mowing height. For higher cut turf, initial symptoms begin as small tan-colored lesions with red to maroon margins often expanding across the leaf blade. In some cases, the lesions may have an hourglass appearance. Infected areas can range from 1-12 inches in diameter. In lower cut turf, symptoms first appear as circular tan spots approximately 1 inch in diameter. These spots can coalesce into larger infected areas. One of the telltale signs of dollar spot is the presence of white mycelium on the leaf blades in the morning after heavy dew.

Keeping the turfgrass healthy and reducing stress, for example, by soil compaction, may help in reducing the damage observed. Proper watering and correcting fertilizer deficiencies, especially phosphorus and potassium are also sometimes helpful in reducing damage caused by microbes. However, the reduction in damage is minimal and in many instances cannot be completely eliminated.

Pesticides are also available to protect live plants from destruction by microbes and insects. However, these pesticides tend to be toxic chemicals with negative environmental implications, as well as having potentially deleterious effects to the health and well-being of the consumers who ingest foods from treated crops. As an example, the fungicide chlorothalonil (the active ingredient in many pesticides) is highly toxic to fish, aquatic invertebrates, mollusks, and shrimp and, accordingly, the U.S. Environmental Protection Agency has imposed restrictions on its use in turfgrass and other crops to reduce the risk of disruption to aquatic ecosystems. As another example, certain pesticides have been demonstrated to be "endocrine disruptors," i.e. adversely affecting the endocrine hormonal system of the body, which may in some cases be permanent and may even occur at low doses or long after the exposure. (Vincelli, P., et al., "Chemical Control of Turfgrass Diseases 2017," pp. 1-32, available at www2.ca.uky.edu/agcomm/pubs/ppa/ppal/ppal.PDF).

It is also well known that microbes eventually develop immunity to many of the manufactured pesticides. Fungicide resistance in, for instance, dollar spot disease is a common problem on golf courses, and how to manage fungicide resistance is a complex and controversial topic that has not yet been definitively answered. (Geunhwa, J., et al., *Golf Course Management Magazine,* 2008 pp. 117-121).

Thus, there exists a need for improved methods of inhibiting microbe growth on live plants that are environmentally friendly, less toxic, and which do not result in microbe immunity or prolong the time to microbe immunity.

SUMMARY OF THE INVENTION

It is an object of the invention to provide methods of inhibiting growth of a microbe on a live plant that, at the same time, are environmentally friendly, less toxic, do not result in microbe immunity, prolong the time to microbe immunity, or a combination thereof.

Therefore, disclosed herein are methods of inhibiting growth of a microbe on a live plant comprising contacting the live plant with an effective amount of a composition comprising a carboxylic acid of Formula (I) or salt thereof:

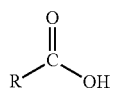

(I)

wherein R is H, Ph, Ar, or a $C_1$-$C_{60}$ alkyl.

Also disclosed herein are live plant products contacted with a composition comprising a carboxylic acid of Formula (I) or salt thereof.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DETAILED DESCRIPTION OF THE INVENTION

Figure 1A:
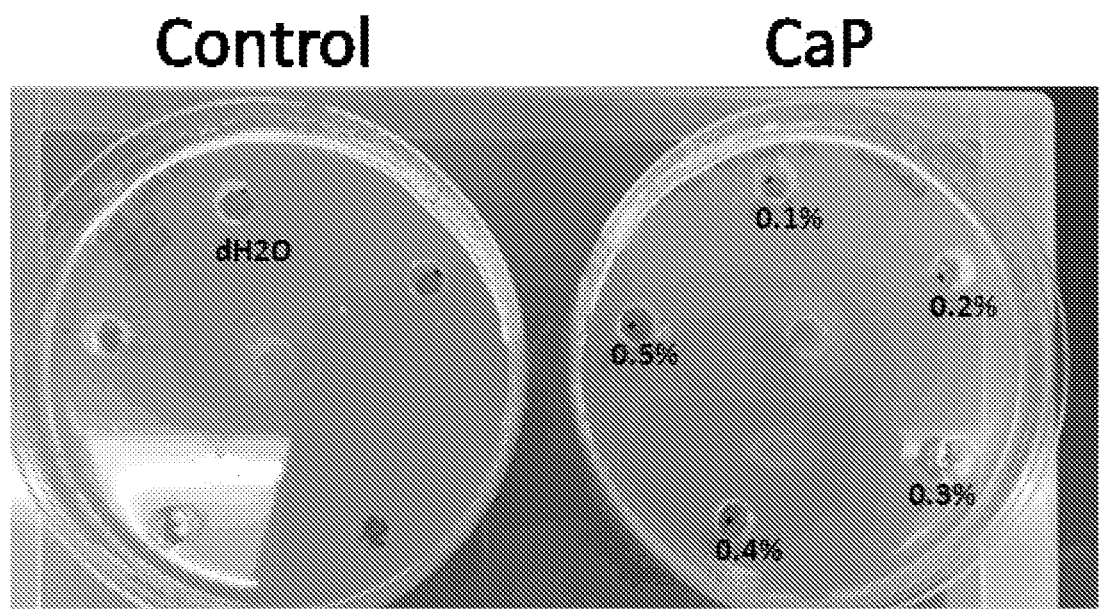
FIG. 1A shows *M. poae* growth three days following inoculation in the presence of 0.1-0.5% (w/v) calcium propionate (CaP).

The present invention relates to methods for inhibiting the growth of a microbe on a live plant using a carboxylic acid composition. The present invention also relates to live plant products contacted with a carboxylic acid composition. In one embodiment of the invention, the carboxylic acid composition of the present invention comprises a carboxylic acid or a salt thereof. The carboxylic acid composition of the present invention may comprise the carboxylic acid of Formula (I) or salt thereof:

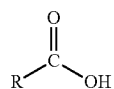

(I)

wherein R is H, phenyl (Ph), Ar, or a $C_1$-$C_{60}$ alkyl. In one embodiment of the invention, the $C_1$-$C_{60}$ alkyl is substituted with at least one substituent selected from the group consisting of: F, Cl, Br, I, At, O, S, S(O), $SO_2$, N, P, P(O), Si, Si(O), B, Al, and combinations thereof. Suitably, Ar is a $C_6$ or $C_{12}$ aryl or heteroaryl optionally substituted group where the heteroatom may be O or N and the substituent may be selected from the group consisting of H, F, Cl, Br, I, At, $SO_2$, $NH_2$, NHR, $NR_2$ and combinations thereof, where R is as defined herein. In another embodiment of the invention, the $C_1$-$C_{60}$ alkyl is substituted with at least one Cl substituent. In another embodiment of the invention, the $C_1$-$C_{60}$ alkyl is substituted with two Cl substituents.

In one embodiment of the invention, R is H or a $C_1$-$C_{10}$ alkyl. In another embodiment of the invention, R is a $C_1$-$C_8$ alkyl. In yet another embodiment of the invention, R is a $C_3$ alkyl.

The term "alkyl" means, unless otherwise stated, a straight or branched chain, acyclic or cyclic hydrocarbon radical, or combination thereof, which may be fully saturated, mono- or polyunsaturated and can include di- and multi-valent radicals, having the number of carbon atoms designated (e.g., $C_{1-10}$ means one to ten carbons) and may be substituted or unsubstituted. Examples of saturated hydrocarbon radicals include groups such as methyl, ethyl, n-propyl, isopropyl, n-butyl, t-butyl, isobutyl, sec-butyl, cyclohexyl, (cyclohexyl)methyl, cyclopropylmethyl, homologs and isomers of, for example, n-pentyl, n-hexyl, n-heptyl, n-octyl, and the like. An unsaturated alkyl group is one having one or more double bonds or triple bonds. Examples of unsaturated alkyl groups include vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers.

In one embodiment of the invention, the carboxylic acid is propionic acid and has the following Formula (II):

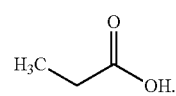

(II)

The carboxylic acid useful in the compositions of the present invention may be formulated with any agriculturally acceptable salt. Examples of salts include, for example, metal salts such as sodium, potassium, calcium and magnesium salts, ammonium salts such as isopropylammonium salts, and trialkylsulfonium salts such as trimethylsulfonium salts.

Carboxylic acid salts useful in the present invention may comprise a carboxylic acid neutralized with, for example, a cation such as $Ca^{+2}$, $Ba^{+2}$, $La^{+3}$, $Cd^{+2}$, $Pb^{+2}$, $Co^{+2}$, $Mn^{+2}$, $Ce^{+4}$, $Mg^{+2}$, $Zn^{+2}$, $Cu^{+2}$, $Fe^{+3}$, $Fe^{+2}$, $Ni^{+2}$, $Sr^{+2}$, $La^{+3}$, $Li^{+1}$, $Na^{+1}$, $K^{+1}$, $Rb^{+1}$, $Cs^{+1}$, $Fr^{+1}$, $Be^{+2}$, $Ra^{+2}$, $Al^{+3}$, $NH_4^+$, $NH_3R^+$, $NH_2R_2^+$, $NHR_3^+$, $NR_4^+$, where R is as herein defined, and the like. Exemplary salts may be salts of alkali metals, alkaline earth metals and or ammonium salts. Alkali metal ions include $Li^{+1}$, $Na^{+1}$, $K^{+1}$, $Rb^{+1}$, $Cs^{+1}$, and $Fr^{+1}$. Alkaline earth metal ions include $Be^{+2}$, $Mg^{+2}$, $Ca^{+2}$, $Sr^+$, $Ba^{+2}$, and $Ra^{+2}$. Ammonium salts include primary, secondary, tertiary and quaternary ammonium salts, such as $NH_4^+$, $NH_3R^+$, $NH_2R_2^+$, $NHR_3^+$, $NR_4^+$, where R is as herein defined.

In one embodiment, the carboxylic acid composition of the invention comprises a calcium salt of the carboxylic acid. In another embodiment of the invention, the carboxylic acid composition of the invention comprises calcium propionate. In yet another embodiment of the invention, the carboxylic acid composition of the invention comprises propionic acid or a salt thereof.

The carboxylic acid composition may also comprise an agriculturally suitable carrier. The agriculturally suitable carrier may be a liquid, a solid, or a surfactant. Examples of solid carriers are described in Watkins, et al., *Handbook of Insecticide Dust Diluents and Carriers*, 2$^{nd}$ Ed., Dorland Books, Caldwell, N.J. Examples of liquid carriers are described in Marsden, *Solvents Guide*, 2$^{nd}$ Ed., Interscience, New York, 1950. *McCutcheon's Detergents and Emulsifiers Annual*, Allured Publ. Corp., Ridgewood, N.J., as well as Sisely and Wood, *Encyclopedia of Surface Active Agents*, Chemical Publ. Co., Inc., New York, 1964, list surfactants and recommended uses. The carboxylic acid composition may also contain additives to reduce foam, caking, corrosion, microbiological growth and the like, or thickeners to increase viscosity.

Surfactants include, for example, polyethoxylated alcohols, polyethoxylated alkylphenols, polyethoxylated sorbitan fatty acid esters, dialkyl sulfosuccinates, alkyl sulfates, alkylbenzene sulfonates, organosilicones, N,N-dialkyltaurates, lignin sulfonates, naphthalene sulfonate formaldehyde condensates, polycarboxylates, and polyoxyethylene/polyoxypropylene block copolymers.

Solid carriers include, for example, ground corn cobs, clays such as bentonite, montmorillonite, attapulgite and kaolin, starch, sugar, silica, talc, diatomaceous earth, urea, calcium carbonate, sodium carbonate, sodium bicarbonate, and sodium sulfate.

Liquid carriers include, for example, water, N,N-dimethylformamide, dimethyl sulfoxide, N-alkylpyrrollidone, ethylene glycol, polypropylene glycol, paraffins, alkylbenzenes, alkylnaphthalenes, oils of olive, castor, linseed, tung, sesame, corn, peanut, cotton-seed, soybean, rape-seed and coconut, fatty acid esters, ketones such as cyclohexanone, 2-heptanone, isophorone and 4-hydroxy-4-methyl-2-pentanone, and alcohols such as methanol, cyclohexanol, decanol and tetrahydrofurfuryl alcohol.

The formulation of the carboxylic acid composition can be selected to be consistent with the physical properties of the carboxylic acid, mode of application, and environmental factors such as soil type, moisture and temperature. Useful formulations include liquids such as solutions (including emulsifiable concentrates), suspensions, emulsions (including microemulsions and/or suspo-emulsions) and the like which optionally can be thickened into gels.

Useful formulations further include solids such as dusts, powders, granules, pellets, tablets, films, and the like which can be water-dispersible ("wettable") or water-soluble. The carboxylic acid composition can be microencapsulated calcium propionate and further formed into a suspension or solid formulation; alternatively the entire formulation can be encapsulated calcium propionate (or "overcoated"). Encapsulated calcium propionate solution can control or delay release of the active ingredient. Sprayable formulations can be extended in suitable media and used at spray volumes from about one to several hundred liters per hectare. High-strength formulations are primarily used as intermediates for further formulation.

In one embodiment of the invention, the carboxylic acid composition is in a liquid formulation. In another embodiment of the invention, the carboxylic acid composition comprises water as a carrier. The carboxylic acid and/or salt thereof may be present in the liquid formulation or water at a concentration range of from 0.1% to 50% (w/v), from 0.5% to 25% (w/v), from 0.1% to 12% (w/v), or from 5% to 12% (w/v). In one embodiment of the invention, the concentration of the carboxylic acid and/or salt is about 5% (w/v).

Carboxylic acid compositions useful in the present invention can also be mixed with one or more fertilizers, pesticides, safeners, insecticides, fungicides, nematocides, bactericides, acaricides, growth regulators, chemosterilants, semiochemicals, repellents, attractants, pheromones, feeding stimulants or other biologically active compounds. Examples of such agricultural protectants with which the carboxylic acid compositions of this invention can be formulated are: insecticides such as abamectin, acephate, azinphos-methyl, bifenthrin, buprofezin, carbofuran, chlorfenapyr, chlorpyrifos, chlorpyrifos-methyl, cyfluthrin, beta-cyfluthrin, cyhalothrin, lambda-cyhalothrin, deltamethrin, diafenthiuron, diazinon, diflubenzuron, dimethoate, esfenvalerate, fenoxycarb, fenpropathrin, fenvalerate, fipronil, flucythrinate, tau fluvalinate, fonophos, imidacloprid, isofenphos, malathion, metaldehyde, methamidophos, methidathion, methomyl, methoprene, methoxychlor, methyl 7-chloro-2,5-dihydro-2-[[N-(methoxycarbonyl)-N-[4-(trifluoromethoxy)phenyl]amino]carbonyl]indeno[1,2-e][1,3,4]oxadiazine-4a(3H)-carboxylate (DPX-JW062), monocrotophos, oxamyl, parathion, parathion-methyl, permethrin, phorate, phosalone, phosmet, phosphamidon, pirimicarb, profenofos, rotenone, sulprofos, tebufenozide, tefluthrin, terbufos, tetrachlorvinphos, thiodicarb, tralomethrin, trichlorfon and triflumuron; fungicides such as azoxystrobin, benomyl, blasticidin-S, Bordeaux mixture (tribasic copper sulfate), bromuconazole, calcium propionatetafol, calcium propionatetan, carbendazim, chloroneb, chlorothalonil, copper oxychloride, copper salts, cymoxanil, cyproconazole, cyprodinil (CGA 219417), diclomezine, dicloran, difenoconazole, dimethomorph, diniconazole, diniconazole-M, dodine, edifenphos, epoxiconazole (BAS480F), famoxadone, fenarimol, fenbuconazole, fenpiclonil, fenpropidin, fenpropimorph, fluazinam, fluguinconazole, flusilazole, flutolanil, flutriafol, folpet, fosetyl-aluminum, furalaxyl, hexaconazole, ipconazole, iprobenfos, iprodione, isoprothiolane, kasugamycin, kresoxim-methyl, mancozeb, maneb, mepronil, metalaxyl, metconazole, S-methyl 7-benzothiazolecarbothioate (CGA 245704), myclobutanil, neo-asozin (ferric methanearsonate), oxadixyl, penconazole, pencycuron, probenazole, prochloraz, propiconazole, pyrifenox, pyroquilon, quinoxyfen, spiroxamine (KWG4168), sulfur, tebuconazole, tetraconazole, thiabendazole, thiophanate-methyl, thiram, triadimefon, triadimenol, tricyclazole, triticonazole, validamycin and vinclozolin; nematocides such as aldoxycarb and fenamiphos; bactericides such as streptomycin; acaricides such as amitraz, chinomethionat, chlorobenzilate, cyhexatin, dicofol, dienochlor, etoxazole, fenazaquin, fenbutatin oxide, fenpropathrin, fenpyroximate, hexythiazox, propargite, pyridaben and tebufenpyrad; and biological agents.

In certain instances, combinations with fungicides having a similar spectrum of control but a different mode of action will be particularly advantageous for inhibition of microbial growth.

The formulations of the invention are used in the customary manner, for example, by watering, spraying, atomizing, scattering, brushing on and as a powder for dry seed treatment, a solution for seed treatment, a water-soluble powder for seed treatment, a water-soluble powder for slurry treatment, encapsulation, or by encrusting. In one embodiment of the invention, the carboxylic acid compositions are contacted with a live plant by spraying.

The methods and products of the present invention are useful for inhibiting the growth of a microbe. The term "inhibiting" microbial growth, or a material which "inhibits" microbial growth, is used to mean materials which either prevent microbial growth, or subsequently kills microbes so that the population is within acceptable limits, or materials which significantly retard the growth processes of microbes or maintain the level or microbes to a prescribed level or range. The prescribed level may vary widely depending upon the microbe and its pathogenicity; generally it is preferred that harmful organisms are present at a level such that any disease or diseases caused by the microbe cannot be visually detected with 20/20 vision at a distance of one meter or more from the live plant. In one embodiment of the invention, microbes cannot be detected or remain at a level which is not harmful to the live plant.

In one embodiment of the invention, the microbe is a fungus or a bacterium. The carboxylic acid compositions of the present invention may be used to inhibit the growth of a fungus belonging to the following classes: Ascomycetes (e.g. *Venturia, Podosphaera, Erysiphe, Monilinia, Mycosphaerella, Uncinula*); Basidiomycetes (e.g. the genus *Hemileia, Rhizoctonia, Phakopsora, Puccinia, Ustilago, Tilletia*); Fungi imperfecti (also known as Deuteromycetes; e.g. *Botrytis, Helminthosporium, Rhynchosporium, Fusarium, Septoria, Cercospora, Alternaria, Pyricularia* and *Pseudocercosporella*); Oomycetes (e.g. *Phytophthora, Peronospora, Pseudoperonospora, Albugo, Bremia, Pythium, Pseudosclerospora,* and *Plasmopara*).

In another embodiment of the invention the microbe is *Scerotinia homoeocarpa, Rhizoctonia solani, Magnaporthe poae, Gaeumannomyces graminis, Puccinnia striiformis*, or *Fusarium oxysporum*.

Specific examples of diseases caused by the microbe include gray snow mold (*Typhula* spp.), pink snow mold (*Microdochium nivale*), leaf spot (*Drechslera* and *Bipolaris* spp.), red thread (*Laetisaria fuciformis*), dollar spot (*Scerotinia homoeocarpa*), brown patch (*Rhizoctonia solani*), large patch (*Rhizoctonia solani*), pink patch (*Limonomyces roseipellis*) gray leaf spot (*Pyricularia grisea*), anthracnose (*Colletotrichum cereale*), phythium blight (*Pythium* spp.), red leaf spot (*Dreschslera erythrospila*), brown ring patch (*Waitea circinata*) powdery mildew (*Blumeria graminis*), slime mold (e.g., *Physarum cinereum*), summer patch (*Magnaporthe poae*), take-all patch (*Gaeumannomyces graminis*), necrotic ring spot (*Ophiosphaerella* spp.), yellow patch (*Rhizoctonia cerealis*), melting out (*Drechslera* and *Bipolaris* spp.), smut diseases (*Ustilago* spp.), and rust diseases (*Puccinnia* spp.), such as stem rust (*Puccinnia striiformis*), and panama disease, or tropical race (TR4), or *Fusarium* wilt (*Fusarium oxysporum*).

According to the invention, "non-living" applies, in general, to a plant that once had, but no longer has, physical life, whereas "living" or "live" applies to a plant that has physical life, i.e. a live plant is one which is actively growing (or is capable of actively growing) compared to harvested plant material and which, for instance, still has functional roots. Merely by way of example, turfgrass that is cut, e.g. by a mower, and is thereby separated from the root is "non-living," while the portions of the turfgrass remaining growing in the growing medium, e.g. soil, is "live" or "living." Similarly, plants that have been cut for, e.g. consumption, such as alfalfa, hay, peanuts, wheat, corn, grain and the like, are "non-living" according to the invention. Merely by way of example, a "living" plant according to the invention can include turfgrass sod, both when grown in surface growing medium, e.g. soil, and also when sliced horizontally into a thin layer for use in a place other than where grown. In other words, turfgrass in sod form is not "non-living" according to the invention merely because it is removed from the surface soil in a thin layer, because the turfgrass sod may be transported and continue to grow in a new location.

According to the invention live "plants" includes both angiosperm and gymnosperm plants. Live "plants" may include, for example, grapevines; cereals, such as wheat, barley, rye or oats; beet, such as sugar beet or fodder beet; fruits, such as pomes, stone fruits or soft fruits, for example apples, pears, plums, peaches, almonds, cherries, strawberries, raspberries or blackberries; leguminous plants, such as beans, lentils, peanuts, alfalfas, peas or soybeans; oil plants, such as rape, mustard, poppy, olives, sunflowers, coconut, castor oil plants, cocoa beans or groundnuts; cucumber plants, such as marrows, cucumbers or melons; fiber plants, such as cotton, flax, hemp or jute; citrus fruit, such as oranges, lemons, grapefruit or mandarins; vegetables, such as spinach, lettuce, asparagus, cabbages, carrots, onions, tomatoes, potatoes, cucurbits or paprika; lauraceae, such as avocados, cinnamon or camphor; maize; tobacco; nuts such as tree nuts; coffee; sugar cane; tea; vines; hops; durian; bananas; natural rubber plants; turfgrass or ornamentals, such as flowers, including tulip bulbs, shrubs, broad-leaved trees or evergreens, for example conifers. Live "plants" according to the invention may be at any stage of development, for example, seed, bulb, immature, or mature.

In one embodiment of the invention, the live plant is an angiosperm plant. In another embodiment of the invention, the live plant is mature. In yet another embodiment of the invention, the live plant is a turfgrass. As used herein, the term "turfgrass" refers to a cultivated grass that provides groundcover, for example a turf or lawn that is periodically cut or mowed to maintain a consistent height.

Examples of cool season turfgrass include, without limitation: bluegrasses (*Poa* spp.), such as Kentucky bluegrass (*Poa pratensis* L.), supina bluegrass (*Poa supina*), rough bluegrass (*Poa trivialis* L.), Canada bluegrass (*Poa compressa* L.), annual bluegrass (*Poa annua* L.), dryland bentgrass (*Agrostis castellena*), upland bluegrass (*Poa glaucantha* Gaudin), wood bluegrass (*Poa nemoralis* L.), and bulbous bluegrass (*Poa bulbosa* L.); the bentgrasses and Redtop (*Agrostis* spp.), such as creeping bentgrass (*Agrostis palustris* Huds. or *Agrostis stolonifera*), colonial bentgrass (*Agrostis tenuis* Sibth.), velvet bentgrass (*Agrostis canina* L.), South German Mixed Bentgrass (*Agrostis* spp. Including *Agrostis tenius* sibth., *Agrostis canina* L., and *Agrostis palustris* Huds.), and Redtop (*Agrostis alba* L.); the fescues (*Festuca* spp.), such as red fescue (*Festuca rubra* L. spp. *rubra*), creeping fescue (*Festuca rubra* L.), chewings fescue (*Festuca rubra commutata* Gaud.), sheep fescue (*Festuca* ovina L.), hard fescue (*Festuca longifolia* Thuill.), hair fescue (*Festuca calcium propionateillata* Lam), tall fescue (*Festuca arundinacea* Schreb.), meadow fescue (*Festuca elanor* L.); the ryegrasses (*Lolium* spp.), such as annual ryegrass (*Lolium multiforum* Lam), perennial ryegrass (*Lolium perenne* L.), and Italian ryegrass (*Lolium multiforum* Lam); and the wheatgrasses (*Agropyron* spp.), such as fairway wheatgrass (*Agropyron cristatum* (L.) Gaertn.), crested wheatgrass (*Agropyron desertorum* (Fisch.) Schult.), and western wheatgrass (*Agropyron smithii* Rydb.). Other cool season turfgrass includes beachgrass (*Ammophila breviligulata* Fern.), smooth bromegrass (*Bromus inermis* Leyss.), cattails such as Timothy (*Phleum pratense* L.), sand cattail (*Phleum subulatum* L.), orchardgrass (*Dactylis glomerata* L.), weeping Alkaligrass (*Puccinellia distans* (L.) Parl.), and crested dog's-tail (*Cynosurus cristatus* L).

Examples of warm season turfgrass include Bermudagrass (*Cynodon* spp. L. C. Rich), Zoysiagrass (*Zoysia* spp. Willd.), St. Augustinegrass (*Stenotaphrum secundatum* Walt Kuntze), Centipedegrass (*Eremochloa ophiuroides* Munro Hack), Carpetgrass (*Axonopus affinis* Chase), Bahiagrass (*Paspalum notatum* Flugge), Kikuyugrass (*Pennisetum clandestinum* Hochst. ex Chiov.), Buffalograss (*Buchloe dactyloids* (Nutt.) Engelm.), Blue gramma (*Bouteloua gracilis* (H.B.K) Lag. ex Griffiths), Seashore *paspalum* (*Paspalum vaginatum* Swartz), and Sideoats grama (*Bouteloua curtipendula* (Michx. Torr.)).

According to one embodiment of the invention, the carboxylic acid composition of the invention is contacted with a cool season turfgrass. In another embodiment of the invention the cool season turfgrass is selected from the group consisting of varieties of fescue, rye and Kentucky bluegrass.

Live plants may be contacted by the carboxylic acid compositions of the invention daily, weekly, every 10 days, biweekly, or monthly. Any treatment schedule may be followed as long as optimal inhibition of microbe growth and/or disease is obtained. In one embodiment of the invention, the carboxylic acid compositions are contacted with a live plant about once every 2 to 30 days, 5 to 21 days, 7 to 21 days, or 7 to 14 days. Treatment may occur less frequently in the cooler seasons.

One or more portions of a live plant may be contacted by the carboxylic acid compositions of the invention, such as leaves, crowns, roots, stolons, stems, foliage, fruit, seeds, seedlings, tubers or bulbs. In one embodiment of the invention, the carboxylic acid composition is contacted with at least one portion of a turfgrass selected from the group consisting of leaf, crown, stolon, root, and combinations thereof. In another embodiment of the invention, the media (e.g., soil or sand) in which the live plant is growing or is to be grown is contacted by the carboxylic acid compositions of the invention.

The carboxylic acid compositions of the present invention can be applied as sprays by methods commonly employed, such as conventional high-gallonage hydraulic sprays, low-gallonage sprays, air-blast, aerial sprays and dusts. The dilution and rate of application will depend upon the type of equipment employed, the method and frequency of application desired and diseases to be controlled. The carboxylic acid compositions of the invention may be applied in the range of from 2 to 50 gallons per 1000 square meter.

An effective amount of the carboxylic acid or salt thereof in the carboxylic acid composition according to the present invention for application to turfgrasses and other similar areas of live plants is typically from about 0.1 to about 30 grams per square meter, from about 1.0 to about 10 grams per square meter, from about 2.5 to about 7.5 grams per square meter, or from about 3.0 to about 5.0 grams per square meter of area to be treated.

In another embodiment, an effective amount of the carboxylic acid or salt thereof in the carboxylic acid composition according to the present invention for application to seeds is from about 10 to about 20 grams per 50 kilograms of seed. In yet another embodiment an effective amount of the carboxylic acid or salt thereof in the carboxylic acid composition according to the present invention can be incorporated into the soil or applied to the surface of the soil at a dosage rate of about 0.5 kg to about 300 kg or from about 1 kg to about 75 kg per hectare.

The present invention also relates to live plant products contacted with compositions comprising a carboxylic acid of Formula (I) or salt thereof. In one embodiment of the invention the live plant product is turfgrass sod that is in contact with a carboxylic acid of Formula (I) or salt thereof, such as propionic acid or calcium propionate. In another embodiment of the invention, the live plant product is soil that is in contact with a carboxylic acid of Formula (I) or salt thereof, such as propionic acid or calcium propionate. In another embodiment of the invention, the live plant product is a flower bulb, such as a tulip bulb, that is in contact with a carboxylic acid of Formula (I) or salt thereof, such as propionic acid or calcium propionate. In another embodiment of the invention, the live plant product is a banana that is in contact with a carboxylic acid of Formula (I) or salt thereof, such as propionic acid or calcium propionate. The methods of the invention may therefore be used to inhibit growth of a fungus in the environment of a live plant. Preferred features of each embodiment described herein may be combined with preferred features of other embodiments as described herein.

EXAMPLES

The following examples are not meant to be limiting and represent certain embodiments of the present invention.

Example 1

Establishing Effective Dose Range for Calcium Propionate Treatment on New Infection in Semi-Solid Medium by Zone of Inhibition Assay, Dose Range of 0.1-0.5% Calcium Propionate (w/v)

Liquid cultures of four common microbes were prepared and are listed below along with the diseases they cause on turfgrass:

| Disease | Microbe |
| --- | --- |
| Dollar Spot | *Scerotinia homoeocarpa* |
| Brown Patch | *Rhizoctonia solani* |
| Summer Patch | *Magnaporthe poae* |
| Take All Patch | *Gaeumannomyces graminis* |

To test the efficacy of calcium propionate (CaP) against the four microbes listed above, zone of inhibition assays were performed. Wells were bored in potato dextrose agarose (PDA) plates then amended with 100 µJ/well calcium propionate at concentrations of 0.1%, 0.2%, 0.3%, 0.4%, and 0.5% (w/v). Control plates were amended with 100 µJ/well dH$_2$O. Plates were inoculated using plugs from active cultures. Growth patterns were observed over seven days. Representative results with *M. poae* are shown at three days following inoculation (FIG. 1A) and seven days following inoculation (FIG. 1B).

Figure 1B:
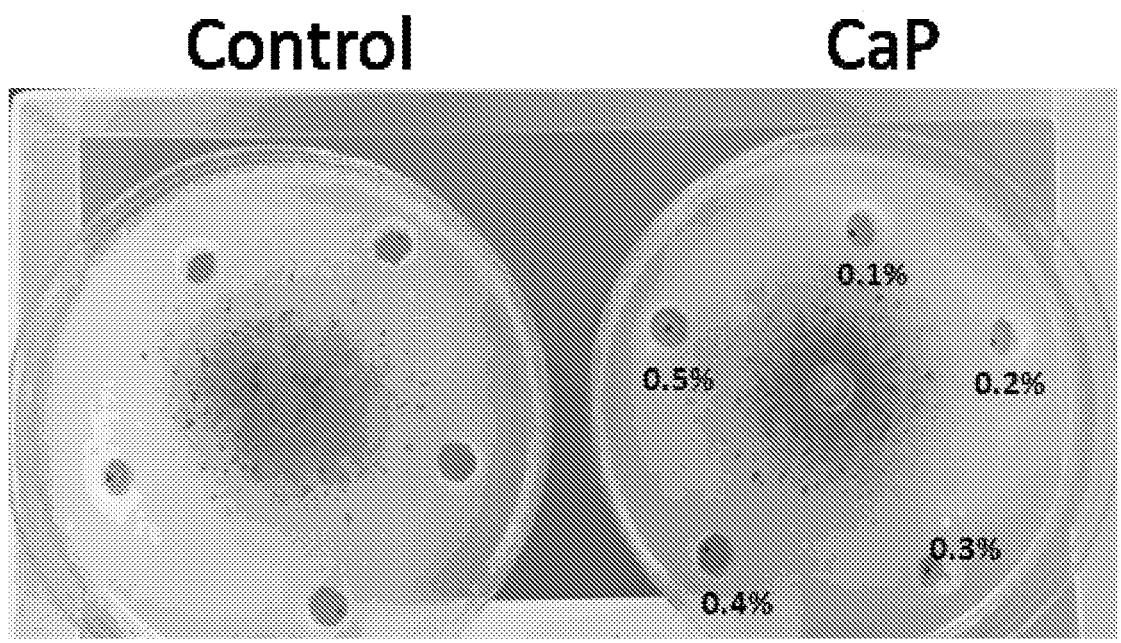
FIG. 1B shows *M. poae* growth seven days following inoculation in the presence of 0.1-0.5% (w/v) calcium propionate (CaP).

As FIGS. 1A and 1B demonstrate, no growth inhibition was observed. Similar results were observed with *S. homoeocarpa, G. graminis*, and *R. solani*. This experiment suggests that concentrations of 0.5% (w/v) calcium propionate or lower are not effective as a fungicidal treatment.

Example 2

Establishing Effective Dose Range for Calcium propionate Treatment on New Infection in Semi-Solid Medium by Zone of Inhibition Assay, Dose Range of 0.5-4% Calcium Propionate (w/v)

The zone of inhibition assays described in Example 1 were performed using calcium propionate doses of 0.5%, 1%, 2%, 3%, and 4% (w/v). Growth diameter was recorded at 2, 5, and 7 days post inoculation. The data shown in Table 1 represent the average±standard deviation (SD) of two replicate plates for each strain tested.

TABLE 1

| Day of Observation | Strain and Growth (cm) | | | | | | | |
|---|---|---|---|---|---|---|---|---|
| | S. homeocarpa | | M. poae | | G. graminis | | R. solani | |
| | Cap | dH2O | Cap | dH2O | Cap | dH2O | Cap | dH2O |
| 2 | 1.9 ± 0.3 | 4.4 ± 0.4 | 1.5 ± 0.2 | 2.0 ± 0 | 1.6 ± 0.1 | 4.4 ± 0.2 | 3.3 ± 0.4 | 3.5 ± 0.4 |
| 5 | 4.5 ± 0.5 | 8.5 ± 0 | 4.3 ± 0.1 | 6.4 ± 0 | 4.7 ± 0.2 | 5.5 ± 0 | 8.5 ± 0 | 8.5 ± 0 |
| 7 | 4.5 ± 0.6 | 8.5 ± 0 | 6.9 ± 0.1 | 8.5 ± 0 | 7 ± 0.1 | 7.2 ± 0 | 8.5 ± 0 | 8.5 ± 0 |

Figure 2A:
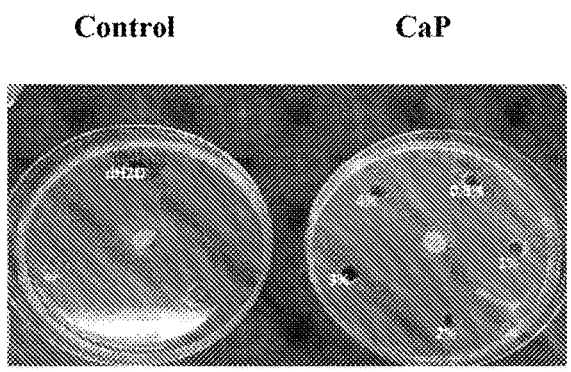
FIG. 2A shows *M. poae* growth inhibition at 2 days following inoculation in the presence of 0.5-4.0% (w/v) calcium propionate (CaP).
Figure 2B:
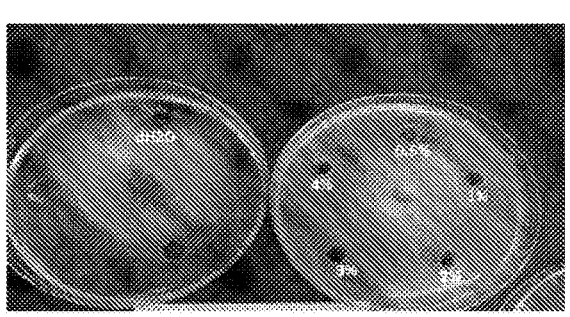
FIG. 2B shows *M. poae* growth inhibition at 5 days following inoculation in the presence of 0.5-4.0% (w/v) calcium propionate (CaP).
Figure 2C:
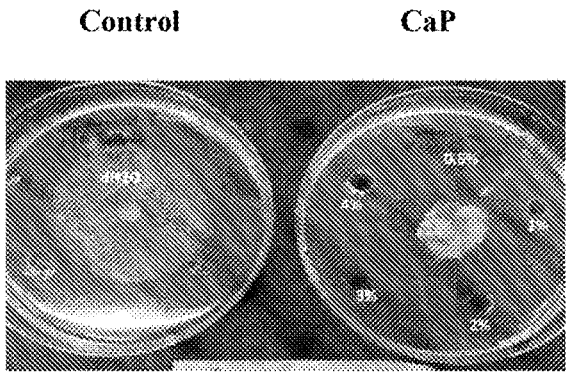
FIG. 2C shows *S. homoeocarpa* growth inhibition at 2 days following inoculation in the presence of 0.5-4.0% (w/v) calcium propionate (CaP).
Figure 2D:
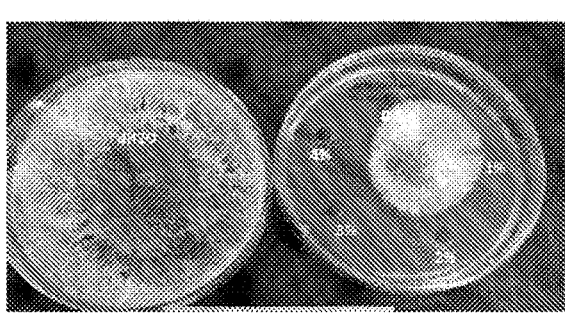
FIG. 2D shows *S. homoeocarpa* growth inhibition at 5 days following inoculation in the presence of 0.5-4.0% (w/v) calcium propionate (CaP).

As shown in Table 1 and FIGS. 2A-2D, S. homoeocarpa and M. poae showed clear growth inhibition over a seven day growth period. Growth inhibition was observed beginning at two days post inoculation (FIGS. 2A and 2C) with pronounced inhibition shown at five days (FIGS. 2B and 2D). Growth at five days was clearly directed towards the 0.5-1% (w/v) calcium propionate wells suggesting the inhibitory effect at a concentration of 2-4% (w/v).

As shown in Table 1, seven days following inoculation S. homoeocarpa growth in the presence of calcium propionate was measured at 6.08±0.57 cm compared with 8.5±0 cm for control plates. M. poae were inhibited to a similar degree. G. graminis inoculants showed growth inhibition at 2 and 5 days post inoculation; however, no growth difference was observed between calcium propionate amended and control plates at 7 days post inoculation. In contrast to the growth inhibition observed in the other three strains, R. solani growth was uninhibited in the presence of calcium propionate.

The zone of inhibition experiments were repeated to confirm the effect of 2-4% (w/v) calcium propionate on growth inhibition of S. homoeocarpa and M. poae. Results from these experiments were mixed, with inhibition observed in the 2-4% (w/v) range but not consistently (data not shown). These inconsistent results suggest that calcium propionate concentrations in the 2-4% range are not high enough to inhibit growth in newly initiated cultures.

Example 3

Establishing Effective Dose Range for Calcium Propionate Treatment on New Infection in Semi-Solid Medium by Zone of Inhibition Assay; Dose Range of 5-12% Calcium Propionate (w/v)

Zone of inhibition assays using PDA plates amended with 5-12% (w/v) calcium propionate were performed as described above. As a control, plates were amended with a composition comprising propiconazole, a commonly used fungicidal treatment for microbe infection of turfgrass, sold under the trademark Banner MaxxII®. Growth diameter was recorded for 13 days post inoculation. The data shown in Table 2 represent the average±standard deviation (SD) of three replicate plates for each strain tested. Inoculants of S. homoeocarpa, M. poae, and R. solani generally grow to luxuriant culture, covering the entire surface of the plate (8.5 cm growth) in 7 days. G. graminis is a slower growing strain, achieving luxuriant growth in 12-14 days.

Following seven days growth in the presence of 5-12% (w/v) calcium propionate, substantial growth inhibition was observed in S. homoeocarpa, M. poae, and G. graminis (4.3 t 0.3 cm, 3.1±0.4 cm, and 4.0±0.6 cm, respectively). Growth inhibition continued through day 10; however, by day 13 inhibitory effects diminished and cultures became luxuriant. In contrast, no inhibition of R. solani growth by calcium propionate concentrations up to 12% (w/v) was observed (Table 2). As expected, cultures inoculated onto plates supplemented with 6% Banner MaxxII® (propiconazole) also showed growth inhibition. Repeat experiments testing 5-12% (w/v) calcium propionate concentration showed similar results, suggesting that this range of calcium propionate concentration is effective for up to 10 days as an antifungal agent against newly established microbe infection.

TABLE 2

| Day of Observation | Strain and Growth (cm) | | | |
|---|---|---|---|---|
| | S. homeocarpa | M. poae | G. graminis | R. solani |
| 2 | 2.8 ± 0.2 | 1.1 ± 0.1 | 1.2 ± 0.3 | 2.6 ± 0.3 |
| 3 | 3.5 ± 0.3 | 1.5 ± 0.2 | 2.2 ± 0.3 | 4.3 ± 0.3 |
| 6 | 3.8 ± 0.1 | 2.1 ± 0.4 | 2.7 ± 0.3 | 8.5 ± 0 |
| 7 | 4.3 ± 0.3 | 3.1 ± 0.4 | 4.0 ± 0.6 | 8.5 ± 0 |
| 10 | 6.2 ± 0.3 | 5.8 ± 0.7 | 5.9 ± 0.5 | 8.5 ± 0 |
| 13 | 7.8 ± 0.6 | 8.2 ± 0.5 | 8.3 ± 0.3 | 8.5 ± 0 |

Example 4

Establishing Effective Dose Range for Calcium Propionate Treatment on New Infection in Semi-Solid Medium Containing Homogenous Distribution of Calcium Propionate.

In contrast to the zone of inhibition assays described in Examples 1-3, for this experiment, PDA with calcium propionate fully integrated into the agarose was prepared. Thus, inoculants were grown on plates in which calcium propionate was incorporated at a uniform concentration throughout the plate, rather than the zones of concentration established by simple diffusion in the zone of inhibition assays. The PDA plates were amended with 5, 7.5, 10, or 12% (w/v) calcium propionate. Growth diameter was recorded for 15 days post inoculation. The data shown in Table 3 represent the results of single plate tests.

In contrast to what was observed in the zone of inhibition assays, inoculants of R. solani showed clear growth inhibition at concentrations of 5% and 7.5% (w/v) calcium propionate following 15 days of observation (4.6 cm and 2.0 cm, respectively, compared with 8.5 cm of growth after 7 days in absence of calcium propionate). Concentrations of 10% and 12% (w/v) calcium propionate fully inhibited growth for 15 days. Plates inoculated with *S. homoeocarpa*, *M. poae*, or *G. graminis* showed no growth at any of the calcium propionate concentrations tested. Repeat experiments showed similar results.

Taken together these data suggest that calcium propionate concentrations of 5% (w/v) or higher are effective for preventing growth of newly initiated cultures of three of the four microbes tested. Additionally, these studies suggest that calcium propionate is also effective against *R. solani* at higher concentrations (10% (w/v) or more).

by inoculating MEB using agarose plugs from luxuriant cultures. Growth was observed over five days. In each microbe examined, visible growth in liquid culture was apparent by day 2 following inoculation with well-established growth by 4 days in the absence of calcium propionate. In contrast, no growth was observed in calcium propionate containing cultures even at the lowest dose of 1% (w/v). To confirm this outcome, the experiments were repeated with similar results, suggesting that calcium propionate doses as low as 1% (w/v) are effective to prevent growth of new inoculants in MEB liquid culture.

TABLE 3

| Day of Observation | Strain and Growth (cm) | | | | | | | | | | | | | | | |
|---|---|---|---|---|---|---|---|---|---|---|---|---|---|---|---|---|
| | *S. homoecarpa* | | | | *M. Poae* | | | | *G. graminis* | | | | *R. solani* | | | |
| | 5% | 7.5% | 10% | 12% | 5% | 7.5% | 10% | 12% | 5% | 7.5% | 10% | 12% | 5% | 7.5% | 10% | 12% |
| 4  | 0 | 0 | 0 | 0 | 0 | 0 | 0 | 0 | 0 | 0 | 0 | 0 | 1.3 | 0   | 0 | 0 |
| 5  | 0 | 0 | 0 | 0 | 0 | 0 | 0 | 0 | 0 | 0 | 0 | 0 | 1.7 | 1   | 0 | 0 |
| 8  | 0 | 0 | 0 | 0 | 0 | 0 | 0 | 0 | 0 | 0 | 0 | 0 | 2.5 | 1.2 | 0 | 0 |
| 11 | 0 | 0 | 0 | 0 | 0 | 0 | 0 | 0 | 0 | 0 | 0 | 0 | 3.2 | 1.2 | 0 | 0 |
| 15 | 0 | 0 | 0 | 0 | 0 | 0 | 0 | 0 | 0 | 0 | 0 | 0 | 4.6 | 2   | 0 | 0 |

To determine whether the observed complete growth inhibition was due to a fungistatic or fungicidal effect of calcium propionate, plug inoculants used to initiate cultures in the presence of calcium propionate (described in Table 3 above) were transferred to PDA plates without calcium propionate. Plates were observed for 14 days. No growth was seen on unamended PDA plates following plug transfer of *S. homoeocarpa*, *M. poae*, and *G. graminis* initially grown on 5, 7.5, 10, or 12% (w/v) calcium propionate. Likewise, *R. solani* plugs that did not show growth on 10% and 12% (w/v) calcium propionate, did not grow when moved to a calcium propionate-free environment. In contrast, transfer of *R. solani* plugs, which showed growth inhibition on 5% and 7.5% (w/v) calcium propionate plates, resulted in luxuriant growth 6-7 days following plug transfer. This data suggests that 5% (w/v) calcium propionate shows a fungicidal effect on three of the four microbes tested.

However, while this concentration of calcium propionate appears to have a growth inhibitory effect on *R. solani*, it is fungistatic rather than fungicidal; 10-12% (w/v) calcium propionate is required to achieve a fungicidal effect on *R. solani*. The observed results demonstrate efficacy of calcium propionate treatment on newly initiated cultures and suggest that calcium propionate may be useful as a prophylactic treatment on turfgrass to prevent microbial infection and/or treat early stage infections.

Example 5

Establishing Effective Dose Range for Calcium Propionate Treatment on New Infection in Liquid Culture Medium Containing Homogenous Distribution of Calcium Propionate.

To examine the effective dose range in liquid culture, malt extract broth (MEB) was prepared and amended with calcium propionate at concentrations of 1, 2, 5 and 10% (w/v). Unamended MEB was used as a control for growth. Each of the four microbes identified in Example 1 was tested twice Example 6

Efficacy of Calcium Propionate Treatment on Established Microbial Infections

To examine the effect of calcium propionate on well-established cultures of *S. homoeocarpa* and *M. poae*, MEB was inoculated with agarose plugs as previously described. Cultures were allowed to grow for 10 days to establish a robust hyphal mat. After 10 days, hyphal mats were disrupted by pipetting to break up mycelium (disrupted culture). One milliliter of disrupted culture was transferred to MEB amended with 1%, 2%, 5%, or 10% (w/v) calcium propionate. MEB without calcium propionate was used as a control. Cultures were allowed to grow for five days following inoculation with disrupted mycelium.

No growth was observed in disrupted cultures of *S. homoeocarpa* and *M. poae* over five days at all calcium propionate doses tested, while disrupted cultures grown in the absence of calcium propionate showed luxuriant growth. These data suggest that calcium propionate may be effective as a treatment for robust infection of at least two common microbes.

To further examine the impact of calcium propionate on established liquid cultures, MEB was inoculated by plug transfer and cultures were allowed to grow for one to six days. Following this, calcium propionate was added to active cultures to a final concentration of 1%, 2%, or 5% (w/v); control cultures had no calcium propionate. Calcium propionate was then added to established one to six day old cultures and cultures were allowed to grow in the presence of calcium propionate for two days, after which, calcium propionate was washed out and cultures were returned to MEB only. Growth following calcium propionate washout was recorded over 14 days.

Figure 3:
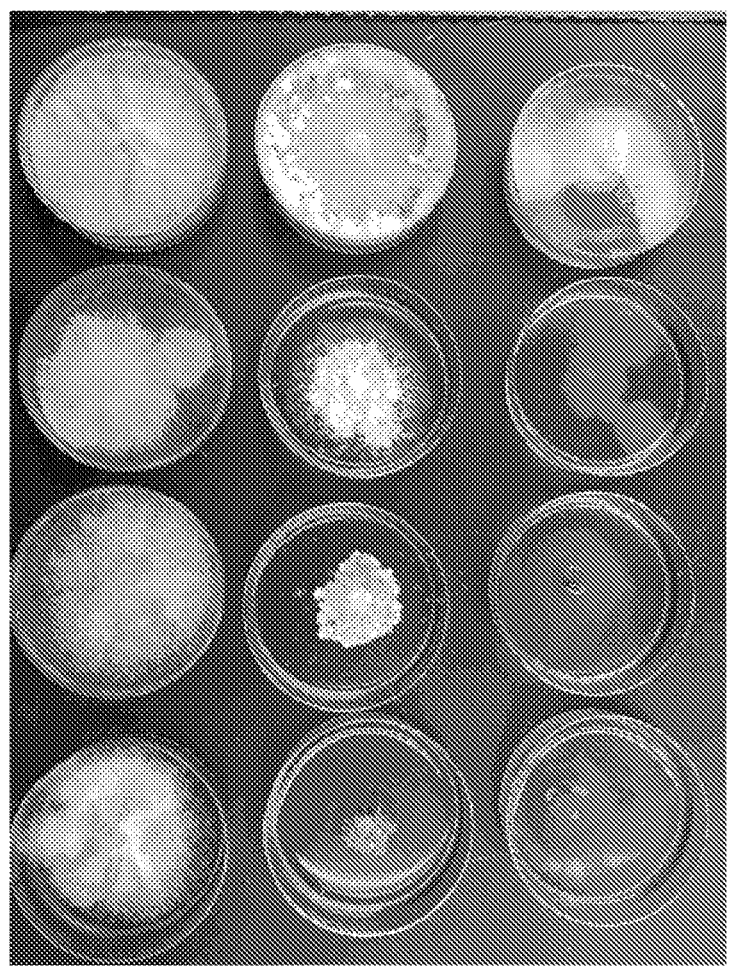
FIG. 3 shows the effects of untreated, as well as 1%, 2%, and 5% (w/v) calcium propionate (CaP) in active cultures of *R. solani*, *S. homoeocarpa* and *M. poae* three days following removal of calcium propionate.

Untreated control cultures showed normal growth patterns for all four microbes tested (FIG. 3). In calcium propionate treated cultures, growth was inhibited while calcium propionate was present at all concentrations tested. Three days following removal of calcium propionate, *S.*

Figure 4:
FIG. 4 shows the effects of 1%, 2%, and 5% (w/v) calcium propionate (CaP) in active cultures of *R. solani*, *S. homoeocarpa*, *G. graminis* and *M. poae* 14 days following removal of calcium propionate.
Figure 5A:
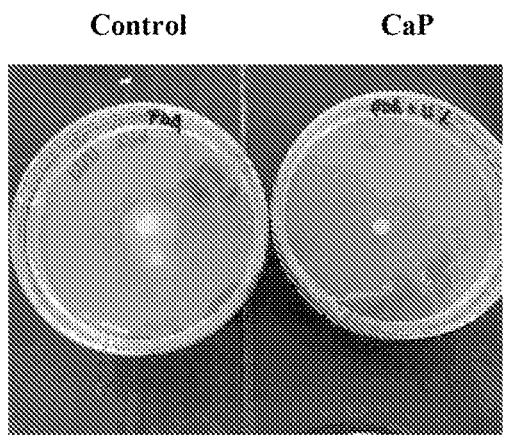
FIG. 5A shows *F. oxysporum* growth inhibition at 2 days in the presence of 15% (w/v) calcium propionate (CaP).
Figure 5B:
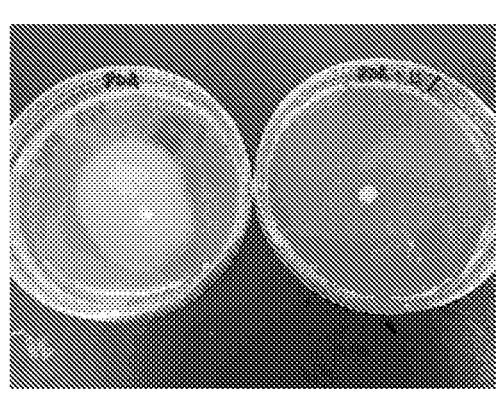
FIG. 5B shows *F. oxysporum* growth inhibition at 4 days in the presence of 15% (w/v) calcium propionate (CaP).
Figure 5C:
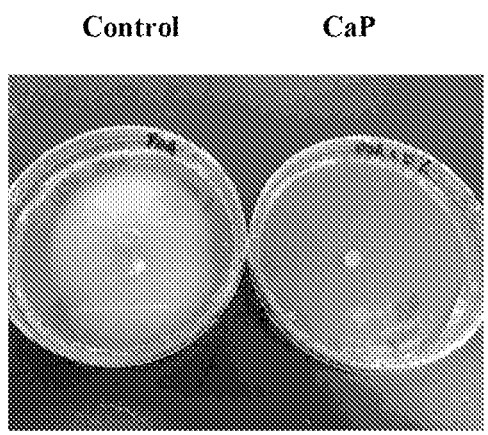
FIG. 5C shows *F. oxysporum* growth inhibition at 5 days in the presence of 15% (w/v) calcium propionate (CaP).
Figure 5D:
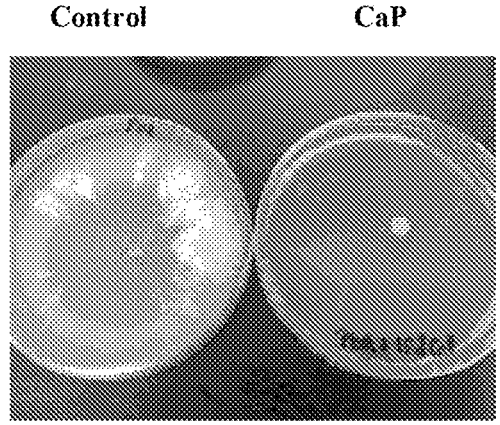
FIG. 5D shows *F. oxysporum* growth inhibition at 7 days in the presence of 15% (w/v) calcium propionate (CaP).

*homoeocarpa, G. graminis* (data not shown) and *M. poae* showed continued growth inhibition at all concentrations tested; in *R. solani* cultures, robust growth was observed following calcium propionate removal at concentrations examined. These results suggest that short term exposure of calcium propionate at concentrations between 1-5% (w/v) results in a fungistatic effect on established cultures of *S. homoeocarpa, G. graminis*, and *M. poae* for at least three days following removal of calcium propionate. Further observation over 14 days revealed some growth recovery (FIG. 4). In cultures of *G. graminis*, concentrations as low as 1% (w/v) appear to have a fungicidal effect as no growth was observed for up to two weeks following calcium propionate removal. In contrast, *S. homoeocarpa* and *M. poae* demonstrated varying degrees of growth recovery at 1% or 2% (w/v) calcium propionate whereas no growth recovery was observed after a 5% (w/v) treatment suggesting a fungistatic effect at this concentration. *R. solani* cultures showed some minor growth inhibition over the course of two weeks at all concentrations tested suggesting that higher concentrations of calcium propionate might show efficacy against this strain (FIG. 4).

Example 7

Establishing Effective Dose Range for Calcium Propionate Treatment on New Infection in Semi-Solid Medium by Zone of Inhibition Assay, Dose Range of 1-15% Calcium Propionate (w/v)

Cultures of *F. oxysporum* were grown on PDA medium until luxuriant. To test the effect of calcium propionate (CaP), fungal plugs were transferred to YPA or PDA amended with CaP and growth was monitored for seven days. YPA plates were amended with 1%, 4%, or 15% CaP. Growth in the presence of 1% CaP was not impacted, whereas *F. oxysporum* was unable to grow in the presence of 4% or 15% CaP (data not shown). Similar results were observed for growth on PDA amended with 15% calcium propionate (FIG. 5). These results suggest that CaP concentrations of 4% or higher are effective for inhibiting *F. oxysporum* growth.

Example 8

Efficacy of Calcium Propionate Treatment on Infected Live Turfgrass Cultivars
Golf Course 1

Calcium propionate was dissolved in water to form a 5% (w/v) solution. Live turfgrass of a golf course exhibiting severe dollar spot infection was divided into four zones. Zone 1 was left untreated, Zone 2 was treated with 2.5 grams calcium propionate per square meter, Zone 3 was treated with 5 grams of calcium propionate per square meter, and Zone 4 was treated with 10 grams of calcium propionate per square meter. The turfgrass was comprised primarily of *Festuca rubra*. The calcium propionate 5% (w/v) solution was sprayed onto the turfgrass.

The four zones were visually inspected for dollar spot after 10 days. Dollar spot could no longer be visually detected in Zones 2, 3, or 4. In contrast, dollar spot could, still be visually detected in untreated Zone 1. A burning effect on the turfgrass was observed in Zone 4. The turfgrass of Zones 2 and 3 appeared healthy.

Thereafter, all of the zones (1-4) were treated with 5 grams of calcium propionate per square meter. The calcium propionate 5% (w/v) solution was sprayed onto the turfgrass every 10 to 14 days. For a period of several months (late summer to early spring), dollar spot could not be visually detected in any of zones 1-4.

Golf Course 2

Calcium propionate was dissolved in water to form a 5% (w/v) solution. Live turfgrass of a golf course exhibiting both dollar spot and *Fusarium oxysporum* infections was treated. The turfgrass was comprised primarily of *Agrostis capillaris*. The calcium propionate 5% (w/v) solution was sprayed onto the turfgrass at a concentration of 3-4 grams per square meter every 10 days. The dollar spot and *Fusarium oxysporum* infections could no longer be visually detected and the turfgrass appeared healthy 10 days following the initial application.

Numbered Embodiments

The following numbered embodiments are provided:
1. A method of inhibiting growth of a fungus on a live angiosperm plant comprising contacting the live angiosperm plant with an effective amount of a composition comprising a carboxylic acid of formula (I) or salt thereof: wherein R is H, substituted or unsubstituted Ph, substituted or unsubstituted Ar, or a substituted or unsubstituted, straight or branched chain, acyclic or cyclic $C_1$-$C_{60}$ alkyl.
2. The method of embodiment 1, wherein R is (i) a substituted or unsubstituted $C_1$-$C_{10}$ alkyl; (ii) a substituted or unsubstituted $C_1$-$C_8$ alkyl; (iii) a substituted or unsubstituted $C_2$-$C_6$ alkyl; or (iv) a substituted or unsubstituted $C_3$ alkyl.
3. The method of embodiment 1 or embodiment 2, wherein R is substituted with (i) at least one substituent selected from the group consisting of: F, Cl, Br, I, At, O, S, S(O), $SO_2$, N, P, P(O), Si, Si(O), B, Al, and combinations thereof; or (ii) at least one substituent selected from the group consisting of: H, F, Cl, Br, I, At, $SO_2$, $NH_2$, NHR, $NR_2$ and combinations thereof.
4. The method of embodiment 3, wherein R is substituted with (i) at least one Cl substituent; or (ii) at least two Cl substituents.
5. The method of any one of embodiments 1 to 4, wherein the alkyl is a straight or branched chain, acyclic or cyclic hydrocarbon radical, or combination thereof, which may be fully saturated, mono- or polyunsaturated and can include di- and multi-valent radicals.
6. The method of any one of embodiments 1 to 5, wherein saturated hydrocarbon radicals are selected from the group consisting of: methyl, ethyl, n-propyl, isopropyl, n-butyl, t-butyl, isobutyl, sec-butyl, cyclohexyl, (cyclohexyl)methyl, cyclopropylmethyl, homologs and isomers of n-pentyl, n-hexyl, n-heptyl, n-octyl; and unsaturated alkyl groups are selected from the group consisting of: vinyl, 2-propenyl, crotyl, 2-isopentenyl, 2-(butadienyl), 2,4-pentadienyl, 3-(1,4-pentadienyl), ethynyl, 1- and 3-propynyl, 3-butynyl, and the higher homologs and isomers.
7. The method of any one of embodiments 1 to 6, wherein carboxylic acid of formula (I) or salt thereof comprises a carboxylic acid neutralized with a cation selected from the group consisting of: $Ca^{+2}$, $Ba^{+2}$, $La^{+3}$, $Cd^{+2}$, $Pb^{+2}$, $Co^{+2}$, $Mn^{+2}$, $Ce^{+4}$, $Mg^{+2}$, $Zn^{+2}$, $Cu^{+2}$, $Fe^{+3}$, $Fe^{+2}$, $Ni^{+2}$, $Sr^{+2}$, $La^{+3}$, $Li^{+1}$, $Na^{+1}$, $K^{+1}$, $Rb^{+1}$, $Cs^{+1}$, $Fr^{+1}$, $Be^{+2}$, $Ra^{+2}$, $Al^{+3}$, $NH_4^+$, $NH_3R^+$, $NH_2R_2^+$, $NHR_3^+$ and $NR_4^+$.
8. The method of any of embodiments 1 to 7, wherein the carboxylic acid is propionic acid.

9. The method of any one of embodiments 1 to 8, wherein the carboxylic acid of formula (I) or salt thereof is calcium propionate.

10. The method of any one of embodiments 1 to 9, wherein the live angiosperm plant is (i) a turfgrass, (ii) a tulip bulb or (iii) a banana plant.

11. The method of any of embodiment 10, wherein (i) from 0.1 to 30 grams: (ii) from 0.1 to 10 grams: (iii) from 2.5 to 7.5 grams or (iv) from 3 to 5 grams of the carboxylic acid or salt thereof is applied per square meter of the turfgrass, tulip bulb or banana plant.

12. The method of any one of embodiments 1 to 11, wherein the live angiosperm plant is mature.

13. The method of any one of embodiments 1 to 12, wherein the composition further comprises water.

14. The method of embodiment 13, wherein the carboxylic acid has a concentration of (i) from 0.1% to 50% (w/v); (ii) from 0.5% to 25% (w/v); (iii) from 0.1% to 12% (w/v); (iv) from 5% to 12% (w/v); or about 5% (w/v).

15. The method of any one of embodiments 1 to 14, wherein the composition is applied once every week to three weeks.

16. A method of inhibiting growth of a fungus on mature, live turfgrass comprising contacting the turfgrass with an effective amount of a composition comprising: propionic acid or a salt thereof; and water.

17. The method of embodiment 16, wherein the propionic acid or a salt thereof is calcium propionate.

18. The method of embodiment or embodiment 16 or embodiment 17, wherein the composition is applied once every week to three weeks.

19. The method of embodiment 16, wherein the composition comprises calcium propionate in a concentration of: (i) from 0.1% to 15% (w/v), (ii) from 0.1% to 12% (w/v); (iii) from 5% to 12% (w/v); (iv) from 0.1% to 0.5% (w/v); (v) from 0.5% to 4%; (vi) from 1% to 5%; (vii) from 2% to 4%; or (viii) about 5% (w/v).

20. The method of any one of embodiments 16 to 19, wherein the turfgrass is a cool season turfgrass.

21. The method of any one of embodiments 16 to 20, wherein the fungus is selected from the group consisting of *Scerotinia homoeocarpa, Rhizoctonia solani, Magnaporthe poae, Gaeumannomyces graminis, Puccinnia striiformis, Fusarium oxysporum*, and combinations thereof.

22. The method of embodiment 21, wherein the fungus is *Scerotinia homoeocarpa*.

23. The method of embodiment 17, wherein from 2.5 to 7.5 grams of calcium propionate is contacted per square meter of the turfgrass.

24. The method of embodiment 17, wherein from 3.0 to 5.0 grams of calcium propionate is contacted per square meter of the turfgrass.

What is claimed is:

1. A method of inhibiting growth of a fungus on a live banana plant comprising contacting the live banana plant with an effective amount of a composition consisting of calcium propionate and water, wherein the calcium propionate has a concentration of from 5% to 12% (w/v).

2. The method of claim 1, wherein the live banana plant is a banana bulb.

3. The method of claim 1, wherein the live banana plant is mature.

4. The method of claim 1, wherein the calcium propionate has a concentration of 5% (w/v).

5. The method of claim 1, wherein the composition is applied once every week to three weeks.

6. The method of claim 1, wherein the fungus is selected from the group consisting of *Sclerotinia* homoeocarpa, *Rhizoctonia solani, Magnaporthe poae, Gaeumannomyces graminis, Puccinnia striiformis, Fusarium oxysporum*, and combinations thereof.

7. The method of claim 1, wherein the fungus is *Sclerotinia* homeocarpa.

8. The method of claim 1, wherein the composition is contacted with the live banana plant by spraying.

9. The method of claim 8, wherein (i) from 0.1 to 30 grams; (ii) from 0.1 to 10 grams; (iii) from 2.5 to 7.5 grams, or (iv) from 3 to 5 grams of the calcium propionate is applied per square meter of the live banana plant.

10. A method of preventing new growth of a fungus on a live banana plant comprising contacting the live banana plant with an effective amount of a composition consisting of calcium propionate and water, wherein the calcium propionate has a concentration of from 1% to 12% (w/v),
 wherein the fungus is selected from the group consisting of *Sclerotinia* homeocarpa, *Rhizoctonia solani, Magnaporthe poae, Gaeumannomyces graminis*, and combinations thereof.

11. The method of claim 10, wherein the live banana plant is a banana bulb.

12. The method of claim 10, wherein the live banana plant is mature.

13. The method of claim 10, wherein the calcium propionate has a concentration of 5% (w/v).

14. The method of claim 10, wherein the composition is applied once every week to three weeks.

15. The method of claim 10, wherein the fungus is *Sclerotinia* homeocarpa.

16. The method of claim 10, wherein the composition is contacted with the live banana plant by spraying.

17. A method of inhibiting growth of a fungus on a live ornamental plant comprising contacting the live ornamental plant with an effective amount of a composition consisting of calcium propionate and water, wherein the calcium propionate has a concentration of from 5% to 12% (w/v),
 wherein the fungus is selected from the group consisting of *Sclerotinia* homeocarpa, *Magnaporthe poae, Gaeumannomyces graminis*, and combinations thereof.

18. The method of claim 17, wherein the live ornamental plant is a bulb.

19. The method of claim 17, wherein the live ornamental plant is mature.

20. The method of claim 17, wherein the composition is applied once every week to three weeks.

* * * * *